United States Patent [19]

Imai et al.

[11] 3,953,410

[45] Apr. 27, 1976

[54] PROCESS FOR PRODUCING AMORPHOUS OLEFIN INTERPOLYMER

[75] Inventors: Daizaburo Imai; Keisaku Yamamoto, both of Ichihara, Japan

[73] Assignee: Sumitomo Chemical Company, Limited, Osaka, Japan

[22] Filed: Apr. 12, 1974

[21] Appl. No.: 460,549

[30] Foreign Application Priority Data

Apr. 16, 1973 Japan............................. 48-43478
Apr. 16, 1973 Japan............................. 48-43480

[52] U.S. Cl.................................. 526/284; 526/99; 526/107; 526/142; 526/281; 526/283; 526/319; 526/338; 526/339
[51] Int. Cl.²................ C08F 210/00; C08F 212/00
[58] Field of Search.............................. 260/80.78

[56] References Cited
UNITED STATES PATENTS

| | | | |
|---|---|---|---|
| 2,956,992 | 10/1960 | Geiseler et al.................. | 260/93.7 |
| 3,574,176 | 4/1971 | Boozer........................... | 260/80.78 |
| 3,642,746 | 2/1972 | Kashiwa......................... | 260/88.2 |
| 3,753,960 | 8/1973 | Easterbrook et al............. | 260/80.78 |

FOREIGN PATENTS OR APPLICATIONS

| | | |
|---|---|---|
| 1,192,770 | 5/1970 | United Kingdom |
| 1,170,406 | 11/1969 | United Kingdom |
| 1,253,713 | 11/1971 | United Kingdom |
| 7,215,694 | 3/1968 | Japan |
| 1,570,905 | 3/1970 | Germany |

*Primary Examiner*—Joseph L. Schofer
*Assistant Examiner*—A. L. Clingman
*Attorney, Agent, or Firm*—Stevens, Davis, Miller & Mosher

[57] ABSTRACT

A substantially amorphous ethylene-$\alpha$-olefin-diolefin rubbery interpolymer is obtained by interpolymerizing ethylene, an $\alpha$-olefin, and as a third component a specified diolefin having a norbornene ring with a catalyst system comprising a specified combination of an ether or ester compound, an organoaluminum compound, and a transition metal compound. The resulting rubbery interpolymer has an excellent extrudability and gives a cured product having favorable physical properties.

31 Claims, No Drawings

PROCESS FOR PRODUCING AMORPHOUS OLEFIN INTERPOLYMER

This invention relates to a process for producing an amorphous olefin interpolymer and, more particularly, to a process for producing a substantially amorphous rubbery interpolymer from ethylene, an α-olefin, and a nonconjugated diolefin.

It has generally been known that a rubbery interpolymer is obtained by polymerizing ethylene and an α-olefin with a catalyst comprising a transition metal compound and an alkylaluminum compound. It has also been known that in order to be curable with sulfur, as is practiced in the rubber industry, an unsaturated linkage is introduced into the polymer by interpolymerizing with a diolefin as a third component. A difficulty encountered in preparing ethylene-α-olefin-diolefin terpolymers consists in that as compared with preparation of ethylene-α-olefin copolymers, a more branched terpolymer is apt to form and, in extreme cases, due to formation of a gel insoluble in hydrocarbon reaction media, a uniform elastomeric interpolymer is difficult to obtain.

It has been known, further, that processibility of a terpolymer and physical properties such as strength and elongation of the cured terpolymer depend on the type of diolefin or catalyst used.

It is disclosed in British Pat. No. 1,253,713 that an interpolymer of favorable physical properties with a limited gel content is obtained at a relatively low temperature of 40°C. or lower by using a catalyst comprising a vanadium compound, an organoaluminum compound represented by the formula $AlR_3$ or $AlR_2X$, and a Lewis base such as an amine, ether, sulfide, or the like, and conducting the polymerization operation in such a specific way that a diolefine is introduced 1 to 5 minutes after ethylene and propylene have been contacted with the catalyst.

However, although practicable in batchwise polymerization, such a way of introducing a diolefin is highly disadvantageous in continuous polymerization on a large scale. Moreover, an interpolymer obtained by use of a trialkyl- or dialkylaluminum compound, such as $AlR_3$ or $AlR_2X$, as an organoaluminum component has generally a broad molecular weight distribution due to presence of a low molecular weight polymer, leading to a disadvantage of inferior tensile strength of the cured product.

An object of this invention is to provide a process for producing a substantially amorphous rubbery interpolymer of ethylene, an α-olefin, and a nonconjugated diolefin, which has an excellent extrudability and gives a cured product of favorable physical properties.

Other objects of this invention will become apparent from the following description.

According to this invention, it is possible to produce easily an ethylene-α-olefin-diolefin interpolymer which has an excellent extrudability and gives a cured product of favorable physical properties, by using a specified diolefin having a norbornene ring as a third monomer and a catalyst comprising a specified combination of an ether or ester compound having a certain structure, a organoaluminum compound, and a transition metal compound.

In order to obtain an interpolymer having a desirable extrudability and capable of yielding a cured product of favorable physical properties by a process advantageously practicable on a commercial scale, the present inventors examined a wide variety of catalysts and, as a result, found that a rubbery interpolymer having particularly an excellent extrudability and capable of yielding a cured product of favorable physical properties is obtained only when ethylene, an α-olefin, and a nonconjugated diolefin having a norbornene ring are interpolymerized by using a catalyst comprising (1) an alkylaluminum sesquihalide represented by the general formula $AlR_{3-n}X_n$ (wherein R is an alkyl group having 1 to 8 carbon atoms, X is a halogen atom, and $n$ is a number larger than 1 but smaller than 2), (2) an ether or ester compound having an aromatic group or/and an olefinically unsaturated group, and (3) a compound of transition metals such as vanadium or/and titanium. Based on this finding, the present invention has been accomplished.

The term "alkylaluminum sesquihalide" as used herein to specify the catalyst component (1) means either an alkylaluminum sesquihalide itself or a mixture containing a substantial amount of the sesquihalide. It is to be understood that the said mixture is empirically represented by the formula $AlR_{3-n}X_n$ (where $n$ is a number larger than 1 and smaller than 2) which shows an average composition, and is formed either by mixing a suitable amount of $AlR_2X$ with $AlRX_2$ or by mixing a suitable amount of $AlR_3$ with $AlX_3$, provided that the R's and X's in the formulas may be either the same or different from one another.

Preferable alkylaluminum sesquihalides include those in which the alkyl group is methyl, ethyl, propyl, butyl, pentyl, hexyl, octyl, or cyclohexyl, and the halogen is chlorine, bromine, or iodine. Particularly preferred is ethylaluminum sesquichloride.

The ether compounds (2) to be used are the following compounds.

i. Aromatic ethers: Derivatives of phenyl ethers or benzyl ethers represented by the general formula

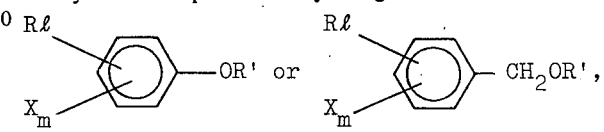

wherein the substituent R represents a hydrocarbon radical having 1 to 20 carbon atoms; X represents a halogen atom; $l$ and $m$ represent number of the substituents R and X, respectively, and are integers from 0 to 5, the sum of $l$ and $m$ not exceeding 5; and R' represents a hydrocarbon radical having 1 to 20 carbon atoms or a hydrocarbon radical of 1 to 20 carbon atoms having substituent groups in which an active hydrogen atom (hydrogen atom in, for example, —NH₂, —OH, or —COOH) is absent.

ii. Unsaturated ethers: Derivatives of vinyl ethers and derivatives of allyl ethers represented by the general formula

wherein R₁ represents hydrogen atom, a hydrocarbon radical having 1 to 20 carbon atoms or a hydrocarbon radical having 1 to 20 carbon atoms and bearing substituents containing no active hydrogen atoms, and R₂ represents; hydrocarbon radicals having 1 to 20 carbon atoms or hydrocarbon radicals of 1 to 20 carbon atoms having substituent groups in which an active hydrogen atom (hydrogen atom in, for example, NH₂, COOH, or OH) is absent.

Examples of the above-noted compounds include diphenyl ether, phenyl methyl ether, phenyl ethyl ether, phenyl propyl ether, phenyl butyl ether, phenyl pentyl ether, phenyl hexyl ether, phenyl benzyl ether, dibenzyl ether, benzyl methyl ether, benzyl ethyl ether, benzyl propyl ether, benzyl butyl ether, benzyl pentyl ether, benzyl hexyl ether, chloroanisole, methylanisole, ethylanisole, safrole, anethole, phenyl glycidyl ether, allyl phenyl ether, allyl glycidyl ether, allyl benzyl ether, allyl ethyl ether, allyl isoamyl ether, phenyl isoamyl ether, amyl benzyl ether, amyl phenyl ether, ethyl vinyl ether, phenyl vinyl ether and the like. Preferred among these are diphenyl ether, phenyl methyl ether, phenyl ethyl ether, ethyl vinyl ether, and the like, particularly phenyl methyl ether.

The ester compounds to be used are the following compounds.

iii. Aromatic esters: Derivatives of benzoic acid esters represented by the general formula

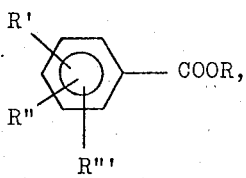

wherein the substituents R', R'', and R''', which may be either the same or different from one another, represent organic radicals containing no active hydrogen atom, such as hydrogen atom, alkyl groups having 1 to 20 carbon atoms, phenyl group, tolyl group, methoxy group, —COOR$_1$ (where R$_1$ is an alkyl group having 1 to 20 carbon atoms, phenyl group, or tolyl group), and halogen atoms; and R represents a hydrocarbon radical having 1 to 20 carbon atoms which may contain substituents in which an active hydrogen atom (the hydrogen atom in, for exaple, —NH$_2$, —COOH, or —OH) is absent.

iv. Unsaturated fatty acid esters represented by the general formula

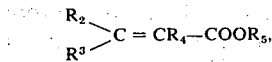

wherein each of R$_2$, R$_3$ and R$_4$ represents hydrogen atom or a hydrocarbon radical having 1 to 20 carbon atoms, and R$_5$ represents a hydrocarbon radical having 1 to 20 carbon atoms.

Examples of the above-noted ester compounds are methyl benzoate, ethyl benzoate, propyl benzoate, butyl benzoate, phenyl benzoate, benzyl benzoate, methyl toluate, ethyl toluate, butyl toluate, phenyl toluate, benzyl toluate, methyl anisate, ethyl anisate, propyl anisate, butyl anisate, phenyl anisate, benzyl anisate, methyl chlorobenzoate, ethyl chlorobenzoate, propyl chlorobenzoate, butyl chlorobenzoate, phenyl chlorobenzoate, benzyl chlorobenzoate, methyl acrylate, ethyl acrylate, propyl acrylate, butyl acrylate, methyl methacrylate, ethyl methacrylate, propyl methacrylate, butyl methacrylate, methyl crotonate, ethyl crotonate, propyl crotonate, butyl crotonate and the like. Preferred among these compounds, are ethyl benzoate, ethyl acrylate, ethyl crotonate, ethyl anisate, and the like particularly ethyl benzoate.

The transition metal compounds (3) to be used are vanadium compounds such as vanadium tetrachloride (VCl$_4$), vanadium oxytrichloride (VOCl$_3$), vanadium trisacetylacetonate (VAC$_3$), vanadyl bisacetylacetonate (VOAC$_2$), and vanadyl trialkoxides (VO(OR)$_3$), and titanium compounds such as titanium tetrachloride (TiCl$_4$) and titanium alkoxides (Ti(OR)$_4$) (Ac means acetylacetonate radical and R represents an alkyl group having 1 to 8 carbon atoms). Preferred among these compounds are vanadium compounds, particularly vanadium oxytrichloride.

The optimum condition for the catalyst to act advantageously is achieved when an alkylaluminum halide and a transition metal compound are present in a ratio within the range from 2 : 1 to 100 : 1, preferably 2 : 1 to 30 : 1, in terms of atomic ratio of aluminum to a transition metal.

The amount of an alkylaluminum halide to be used is 1.0 to 100, preferably 1.0 to 20 millimoles for 1 liter of the solvent.

Although it can be varied in broader range, the quantity of an ether or ester compound to be added is generally 0.1 to 100, preferably 0.1 to 20, moles for mole of the transition metal atom in the catalyst. If the amount added is less than the lower limit of the said range, substantial improvement of the catalyst becomes less marked, while if the amount exceeds the upper limit of the said range, the catalyst becomes less active, leading to a disadvantage of increased catalyst cost. In any case, the most effective amount to be added of an ether or ester compound is selected according to its type as well as the type and ratio of the alkylaluminum halide and transition metal compound.

Introduction of the catalyst components can be conducted in various ways. For example, the components are introduced by a method in which they are mixed prior to the introduction into the reactant mixture, or by a method in which the catalyst components are directly introduced into the reaction mixture continuously or portionwise during the course of polymerization, or by a method in which, among the catalyst components, either a transition metal compound or an alkylaluminum halide is mixed with an ether or ester compound prio to the introduction.

The three starting monomers for use in this invention are (I) ethylene, (II) α-olefins, and (III) nonconjugated diolefins having a norbornene ring. Preferable α-olefins (II) are those having 3 to 10 carbon atoms, examples of which include propylene, butene-1, pentene-1, hexene-1, octene-1, decene-1, 4-methyl pentene-1 and the like. Of these, propylene is most preferable, though other olefins are also used according to the intended object. Amount of the α-olefin contained in the interpolymer is preferably 15 to 85, particularly 15 to 60, mole-%. The nonconjugated diolefins (III) having a norbornene ring are methylenenorbornene, ethylidenenorbornene, n- and iso-propylidenenorbornene, n- and iso-butylidenenorbornene, vinylnorbornene, n- and iso-propenylnorbornene, n- and iso-butenylnorbornene, norbornadiene, dicyclopentadiene, methyldicyclopentadiene and the like. A preferable amount of such a diolefin contained in the interpolymer is 3 to 60, preferably 3 to 30, in terms of iodine value of the interpolymer. Interpolymers to which the present process is most effectively applicable are terpolymers obtained by interpolymerization of ethylene and propylene with an alkylidenenorbornene such as methylenenorbornene, ethylidenenorbornene, n- or iso-propylidenenorbornene, n- or iso-butylidenenorbornene, or the like.

The polymerization can be conducted either in the presence or in the absence of an inert solvent. Examples of suitable solvents include hexane, heptane, octane, and cyclohexane among aliphatic hydrocarbons; benzene, toluene, xylene, and ethylbenzene among aromatic hydrocarbons; and chlorobenzene, tri- and tetra-chloroethylene among halogenated hydrocarbons. These solvents are used each alone or in combinations.

Although the polymerization temperature can be varied over a broad range, for example, from −50° to +100°C., it is preferable to conduct polymerization at a temperature of 0° to 80°C., particularly 20° − 70°C. The polymerization can be carried out under an atmospheric pressure or a superatmospheric pressure, for example, from 1 to 50 kg/cm², preferably from 1 to 30 kg/cm². The polymerization can be carried out either intermittently or continuously.

The invention is illustrated below in further detail with referrence to Examples, but the invention is not limited to the Examples.

EXAMPLE 1

Into one liter of purified hexane placed in a 2-liter reactor provided with a cooler, stirrer, thermometer, gas inlet tube reaching below the liquid surface, and dropping funnels, were introduced purified ethylene and propylene at the rates of 3 liters/minute and 7 liters/minute, respectively, to saturate the hexane. As a molecular weight regulating agent, hydrogen was continuously introduced at a rate of 1 liter/minute and the temperature in the reactor was adjusted to 30°C. Into the reactor, was introduced through the dropping funnel 6 millimoles of ethylidenenorbornene as a nonconjugated diolefin. While continuing the introduction of monomers and with continued stirring, a mixture of 0.4 millimole of vanadium oxytrichloride and 0.4 millimole of anisole and 30 ml of a hexane solution containing 4 millimoles of $AlEt_{1.5}Cl_{1.5}$, said mixture and the hexane solution having been prepared separately in the dropping funnels, were simultaneously charged into the reactor to initiate the polymerization. After the polymerization had proceeded for 15 minutes at 30°C., 30 ml of methanol containing 1% by weight of 2,6-ditertbutyl-4-hydroxytoluene was added to terminate the polymerization. After having been removed of the catalyst components by washing with 100 ml of methanol, the polymerization mixture was poured into a large volume of methanol to obtain an interpolymer which was dried at 40°C. under a reduced pressure to remove the residual solvent.

The interpolymer thus obtained weighed 7.4 g and showed an ethylene-to-propylene molar ratio of 63/37 as measured by infrared spectroscopy, an intrinsic viscosity of 1.3, as measured in xylene at 70°C., and an iodine value of 13.1.

EXAMPLES 2 to 4

Interpolymers were obtained by repeating practically the same procedure as in Example 1, except that diphenyl ether, chloroanisole, or dibenzyl ether was used as ether compound. The results obtained were as shown in Table 1.

COMPARATIVE EXAMPLE 1

For comparison, an interpolymer was obtained by practically the same procedure as in Example 1, except that neither an ether compound nor an ester compound was used. The results obtained were as shown in Table 1.

COMPARATIVE EXAMPLE 2

In order to confirm that the ether compound for use in this invention should contain an aromatic ring or an unsaturated bond, an interpolymer was prepared by practically the same procedure as in Example 1, except that diethyl ether was used as an example for unsuitable ether compound. The results obtained were as shown in Table 1.

EXAMPLES 5 TO 8

Interpolymers were obtained also by repeating practically the same procedure as in Example 1, except that ethyl benzoate, ethyl acrylate, benzyl benzoate, or ethyl anisate was used as ester compound. The results obtained were as shown in Table 1.

COMPARATIVE EXAMPLE 3

In order to confirm that the ester compound for use in this invention should contain an aromatic ring or an unsaturated bond, an interpolymer was prepared by practically the same procedure as in Example 1, except that ethyl acetate was used as an example for unsuitable ester compound. The results obtained were as shown in Table 2.

In Tables 1 and 2 are shown, for comparison, yields and structural characteristics of the interpolymers obtained and the results of evaluation for their extrudability conducted in the following manner:

The interpolymer was melt-extruded by means of a Capillary Extrusion Rheometer made by Toyo Seiki Seisakusho Co. and the extrudate was tested for surface appearance, diameter, and melt viscosity which can be calculated from the extrusion pressure and the rate of extrusion.

The testing conditions were as follows:
Temperature, 125°C.; die orifice, 1 mm in diameter and 30 mm in length;
Rate of extrusion in volume (cm³/min.): 0.002, 0.05, 0.1, 0.2, 0.3, 0.5, 1.0, 1.5, 2.0, 3.0, 5.0, 10

With the progressive step-up in shear rate, the surface appearance of the extrudate changes from smooth texture until melt fracture occurs when the "critical shear rate" is reached. The higher the "critical shear rate" or the "critical fracture point" is, the more favorable is the interpolymer for extrusion molding, namely, the more desirable is its extrudability. When the rate of extrusion is kept constant, the lower the melt viscosity, the less becomes the energy required for extrusion, and the lower the zero shear viscosity calculated from the above measurement, the better is the extrudability.

Table 1

|  | Ether compound | Yield (g) | Et/Pr mole ratio | Iodine value | $(\eta)$ 70°C. xylene | Zero shear viscosity[1] | Critical fracture point[2] |
| --- | --- | --- | --- | --- | --- | --- | --- |
| Example 1 | Anisole | 7.4 | 63/37 | 13.1 | 1.34 | 1.7 | 10 |

Table 1-continued

|  | Ether compound | Yield (g) | Et/Pr mole ratio | Iodine value | $(\eta)$ 70°C. xylene | Zero shear viscosity[1] | Critical fracture point[2] |
|---|---|---|---|---|---|---|---|
| Example 2 | Diphenyl ether | 9.2 | 63/37 | 11.1 | 1.29 | 2.9 | 10 |
| Example 3 | Chloroanisole | 9.0 | 62/38 | 11.0 | 1.38 | 1.6 | 10 |
| Example 4 | Benzyl ether | 10.8 | 61/39 | 9.8 | 1.20 | 1.5 | 10 |
| Comparative Example 1 | None | 10.1 | 64/36 | 9.7 | 1.34 | 3.3 | 2 |
| Example 2 | Diethyl ether | 8.4 | 62/38 | 13.2 | 1.56 | 7.0 | 1 |

Note:
[1] Melt viscosity when the shearing stress is extrapolated to zero. Unit: $10^5$ poise at 125°C.
[2] Rate of extrusion when melt fracture begins to occur. Unit: $10^{-1}$ cm³/min.

Table 2

|  | Ester compound | Yield (g) | Et/Pr mole ratio | Iodine value | $(\eta)$ 70°C., xylene | Zero shear viscosity[1] | Critical fracture point[2] |
|---|---|---|---|---|---|---|---|
| Example 5 | Ethyl benzoate | 10.3 | 64/36 | 10.5 | 1.44 | 2.0 | 10 |
| Example 6 | Ethyl acrylate | 9.0 | 61/39 | 12.8 | 1.31 | 1.4 | 15 |
| Example 7 | Benzyl benzoate | 10.5 | 60/40 | 10.0 | 1.51 | 2.1 | 10 |
| Example 8 | Ethyl anisate | 10.2 | 62/38 | 10.3 | 1.29 | 1.9 | 10 |
| Comparative Example 3 | Ethyl acetate | 9.4 | 64/36 | 13.3 | 1.29 | 2.8 | 3 |

Note:
[1] Melt viscosity when the shearing stress is extrapolated to zero. Unit: $10^5$ poise at 125°C.
[2] Rate of extrusion when melt fracture begins to occur. Unit: $10^{-1}$ cm³/min.

From the comparison of comparative Examples 1 to 3 with Examples 1 to 8 as shown in Tables 1 and 2, it is clear that an interpolymer produced according to the process of the present invention is low in melt viscosity, high in "critical shear rate" and very excellent in extrudability. Thus, the utility of the present invention is proved.

EXAMPLE 9

Practically the same procedure as in Example 1 was repeated using the same device, except that 0.4 millimole of $VCl_4$, 4 millimoles of an equimolar mixture of $AlEt_2Cl$ and $AlEt_{1.5}Cl_{1.5}$, and 0.4 millimole of chloroanisole were used and said chloroanisole had been previously added to the reactor. The interpolymer obtained weighed 10.2 g.

The molar ratio of ethylene unit to propylene unit in the interpolymer was 64/36. The interpolymer had an intrinsic viscosity of 1.20, as measured in xylene at 70°C., and an iodine value of 9.8.

On evaluating extrudability of the interpolymer, it was found that the zero shear viscosity was $7.2 \times 10^4$ poises and the critical fracture point was 20, indicating very excellent extrudability.

EXAMPLE 10

An interpolymer of ethylene, propylene, and ethylidenenorbornene was prepared by a continuous procedure in a 2-liter autoclave in the following way.

Into the said reactor previously dried, were introduced continuously 3,181 g/hour of hexane, 206 g/hour of ethylene, 1,026 g/hour of propylene, 20.7 g/hour of ethylidenenorbornene, and 0.34 g/hour of hydrogen. While maintaining inner temperature of the reactor at 30°C., 5.21 g/hour of ethylaluminum sesquichloride and 1.58 g/hour of an equimolar mixture of vanadium oxytrichloride and ethyl benzoate were continously introduced. While maintaining the pressure in the reactor at 15 kg/cm² (gage), the reaction mixture was continuously withdrawn and freed from the unreacted ethylene and propylene. At the same time, 180 ml/hour of isopropanol was contacted with the withdrawn reaction mixture to deactivate the catalyst. The catalyst remnants were then removed by washing the reaction mixture with an equal volume of water at 50°C. with vigorous stirring. After having been separated from water, the resulting solution was subjected to a steam-stripping treatment to obtain 300.1 g/hour of an amorphous interpolymer. Characteristics properties of the interpolymer thus obtained were as follows:

| | |
|---|---|
| Mooney viscosity, $ML_{1+4}^{100°C.}$ | 33 |
| $(\eta)$, 70°C., xylene solution | 1.26 |
| Molar ratio of ethylene unit to propylene unit | 64/36 |
| Iodine value | 7.4 |
| Zero shear viscosity, $10^5$ poise | 1.4 |
| Critical fracture point, $10^{-1}$ cm³/min. | 15 |

COMPARATIVE EXAMPLE 4,

For comparison, an interpolymer was prepared in the same manner as in Example 10, except that ethyl benzoate was not used. Characteristic properties of the resulting interpolymer were as shown below.

| | |
|---|---|
| Mooney Viscosity, $ML_{1+4}^{100°C.}$ | 35 |
| $(\eta)$, 70°C., xylene solution | 1.25 |
| Molar ratio of ethylene unit to propylene unit | 63/37 |
| Iodine value | 7.6 |
| Zero shear viscosity, $10^5$ poise | 4.2 |
| Critical fracture point, $10^{-1}$ cm³/min. | 1 |

By comparison of the interpolymer obtained in Example 10 and Comparative Example 4 with each other, it is seen that as compared with the interpolymer of Comparative Example 4 having approximately the same Mooney viscosity, the interpolymer of Example 10, which was obtained according to this invention, has far superior extrudability, being extrudable without fracture at a rate 15 time as high as that of the former interpolymer.

EXAMPLE 11

Continuous polymerization was carried out in a manner similar to that in Example 10. Into a 2-liter reactor, were introduced continuously 3,165 g/hour of hexane, 205 g/hour of ethylene, 1.021 g/hour of propylene, 20.6 g/hour of ethlideneorbornene, and 0.25 g/hour of hydrogen. As the catalyst, 6.76 g/hour of ethylaluminum sesquichloride and 1.78 g/hour of an equimolar mixture of vanadium oxytrichloride and anisole were also introduced continuously. The polymerization procedure was practically the same as in Example 10 and 334.5 g/hour of an amorphous interpolymer was obtained. The interpolymer had the following characteristics properties.

| | |
|---|---|
| Mooney viscosity, $ML_{1+4}^{100 °C}$ | 39 |
| $(\eta)$, 70°C., xylene solution | 1.44 |
| Molar ratio of ethylene unit to propylene unit | 63/37 |
| Iodine value | 6.4 |
| Zero shear viscosity, $10^5$ poise | 1.7 |
| Critical fracture point, $10^{-1}$ cm$^3$/min. | 15 |

COMPARATIVE EXAMPLE 5

For comparison, an interpolymer was prepared in the same maner as in Example 11, except that anisole was not used. Characteristic properties of the interpolymer obtained were as shown below.

| | |
|---|---|
| Mooney viscosity, $ML_{1+4}^{100 °C}$ | 40 |
| $(\eta)$, 70°C., xylene solution | 1.36 |
| Molar ratio of ethylene unit to propylene unit | 63/37 |
| Iodine value | 7.8 |
| Zero shear viscosity, $10^5$ poise | 6.2 |
| Critical fracture point, $10^{-1}$ cm$^3$/min. | 1 |

By comparison of the interpolymers obtained in Example 11 and Comparative Example 5 with each other, it is seen that as compared with he interpolymer of Comparative Example 5 having approximately the same Mooney viscosity, the interpolymer of Example 11, which was obtained according to this invention, has far superior extrudability, being extrudable without fracture at a rate 15 times as high as that of the former interpolymer.

The interpolymers obtained in Example 11 and Comparative Example 5 were compounded according to the following recipe and extrusion-molded. The results obtained were shown in Table 3.

| | | |
|---|---|---|
| Copolymer | 100 | Parts |
| Mistron paper | 50 | |
| Process oil | 5 | |
| Zinc oxide | 5 | |
| Stearic acid | 1 | |
| Percumyl D | 5 | |
| Sulfur | 0.5 | |

Table 3

| | No. of revolution of screw | Interpolymer of Example 11 | Interpolymer of comparative Example 5 |
|---|---|---|---|
| Rate of extrusion (m/min.) | 60 rpm | 33.2 | 25.7 |
| | 30 | 16.7 | 13.7 |
| | 10 | 5.6 | 4.5 |
| Throughput (g/min.) | 60 | 381 | 336 |
| | 30 | 195 | 183 |
| | 10 | 68 | 60 |
| Die swell (%) | 60 | 21.4 | 33.6 |
| | 30 | 29.7 | 29.7 |
| | 10 | 26.1 | 33.4 |
| Surface appearance of extrudate | | Smooth | Irregular |

Note:
A 40-mm extruder with a die for rod extrusion was used.

EXAMPLE 12

Continuous polymerization was carried out in a manner similar to that in Example 10. Into a 2-liters reactor, were introduced continuously 3,167 g/hour of hexane, 205 g/hour of ethylene, 1,022 g/hour of propylene, 23.2 g/hour of dicyclopentadiene, and 0.36 g/hour of hydrogen. As the catalyst, 6.29 g/hour of ethylaluminum sesquichloride and 1.67 g/hour of an equimolar mixture of vanadium oxytrichloride and anisole were introduced continuously. The polymerization procedure was practically the same as in Example 10 and 334.8 g/hour of an amorphous interpolymer was obtained. The interpolymer had the following characteristics, indicating improved extrudability compared with that of a customary ethylene-propylene-dicyclopentadiene interpolymer.

| | |
|---|---|
| Mooney viscosity, $ML_{1+4}^{100 °C}$ | 37 |
| $(\eta)$, 70°C., xylene solution | 1.32 |
| Molar ratio of ethylene unit to propylene unit | .61/39 |
| Iodine value | 8.7 |
| Zero shear viscosity, $10^5$ poise | 3.1 |
| Critical fracture point, $10^{-1}$ cm$^3$/min. | 5 |

EXAMPLE 13

Continuous polymerization was carried out in a manner similar to that in Example 10. Into a 2-liters reactor were introduced continuously 3,183 g/hour of hexane, 206 g/hour of ethylene, 1,027 g/hour of propylene, 23.2 g/hour of dicyclopentadiene, and 0.44 g/hour of hydrogen. As the catalyst, 6.24 g/hour of ethylaluminum sesquichloride and 1.72 g/hour of an equimolar mixture of vanadium oxytrichloride and ethyl acrylate were introduced continuously. The polymerization procedure was practically the same as in Example 10 and 323.6 g/hour of an amorphous interpolymer was obtained. The interpolymer had the following characteristics, indicating improved extrudability compared with that of a customary ethylene-propylene-dicyclopentadiene interpolymer.

| | |
|---|---|
| Mooney viscosity, $ML_{1+4}^{100 °C}$ | 29 |
| $(\eta)$, 70°C., xylene solution | 1.27 |
| Molar ratio of ethylene unit to propylene unit | 63/37 |
| Iodine value | 8.9 |
| Zero shear viscosity, $10^5$ poise | 1.2 |

| Critical fracture point, $10^{-1}$ cm$^3$/min. | 5 |

What is claimed is:

1. A process for producing a substantially amorphous rubbery interpolymer, which comprises interpolymerizing ethylene, an α-olefin, and a nonconjugated diolefin having a norbornene ring by use of a catalyst comprising a combination of (1) an alkylaluminum sesquichalide represented by the general formula $AlR_{3-n}X_n$ (where R is an alkyl group having 1 to 8 carbon atoms, X is a halogen atom, and n is a number larger than 1 but smaller than 2), (2) an ester compound having an aromatic group or/and an olefinically unsaturated group, and (3) at least one compound selected from transition metal compounds.

2. A process according to claim 1, wherein the α-olefin is a member selected from the group consisting of α-olefins having 3 to 10 carbon atoms.

3. A process according to claim 2, wherein the α-olefin is propylene.

4. A process according to claim 1, wherein the nonconjugated diolefin is methylenenorbornene, ethylidenenorbornene, n-propylidenenorbornene, isopropylidenenorbornene, n-butylidenenorbornene, isobutylidenenorbornene, vinylnorbornene, n-propenylnorbornene, isopropenylnorbornene, n-butenylnorbornene, isobutenylnorbornene, norbornadiene, dicyclopentadiene, or methyldicyclopentadiene.

5. A process according to claim 1, wherein the α-olefin is propylene and the nonconjugated diolefin is methylenenorbornene, ethylidenenorbornene, n-propylidenenorbornene, isopropylidenenorbornene, n-butylidenenorbornene, or isobutylidenenorbornene.

6. A process according to claim 1, wherein the alkyl group of the alkylaluminum sesquihalide is methyl, ethyl, propyl, butyl, pentyl, hexyl, octyl or cyclohexyl group and the halogen in the alkylaluminum sesquihalide is chlorine, bromine, or iodine.

7. A process according to claim 7, wherein the alkylaluminum halide is ethylaluminum sesquichloride.

8. A process according to claim 1, wherein the aromatic ester is a compound represented by the general formula

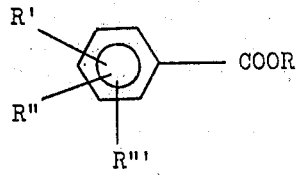

wherein the substituents R', R'', and R''' are the same or different from one another and each represents hydrogen atom, an alkyl group having 1 to 20 carbon atoms, phenyl group, tolyl group, methoxy group, -COOR$_1$ (wherein R$_1$ is an alkyl group having 1 to 20 carbon atoms, phenyl group, or tolyl group), or an organic radical containing no active hydrogen atom, and R represents a hydrocarbon radical having 1 to 20 carbon atoms and bearing a substituent containing no active hydrogen atom.

9. A process according to claim 8, wherein the aromatic ester is ethyl benzoate, methyl benzoate, ethyl anisate or methyl anisate.

10. A process according to claim 9, wherein the aromatic ester is ethyl benzoate.

11. A process according to claim 1, wherein the unsaturated fatty acid ester is a compound represented by he general formula

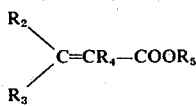

wherein each of R$_2$, R$_3$, and R$_4$ represents hydrogen atom, or a hydrocarbon radical having 1 to 20 carbon atoms, and R$_5$ represents a hydrocarbon radical having 1 to 20 carbon atoms.

12. A process according to claim 11, wherein the unsaturated aliphatic acid ester is ethyl acrylate.

13. A process according to claim 1, wherein the transition metal compound is at least one member selected from vanadium compounds and titanium compounds.

14. A process according to claim 13, wherein the transition metal compound is a vanadium compound.

15. A process according to claim 14, wherein the vanadium compound is vanadium tetrachloride, vanadium oxytrichloride, vanadium trisacetylacetonate, vanadyl bisacetylacetonate, or a vanadyl trialkoxide.

16. A process according to claim 15, wherein the vanadium compound is vanadium oxytrichloride.

17. A process according to claim 13, wherein the transition metal compound is a titanium compound.

18. A process according to claim 17, wherein the titanium compound is titanium tetrachloride or a titanium alkoxide.

19. A process according to claim 1, wherein the ratio of the alkylaluminum halide to the transition metal compound is 2 : 1 to 100 : 1 in terms of the ratio of aluminum atoms to transition metal atoms.

20. A process according to claim 1, wherein the alkylaluminum halide is used in an amount of 1.0 to 100 millimoles for 1 liter of the solvent used.

21. A process according to claim 1, wherein the ester compound is used in an amount of 0.1 to 100 moles per 1 mole of the transition metal atom.

22. A process according to claim 1, wherein a solvent is used.

23. A process acording to claim 22, wherein the solvent is at least one member selected from the group consisting of aliphatic hydrocarbons, aromatic hydrocarbons, and halogenated hydrocarbons.

24. A process according to claim 23, wherein the aliphatic hydrocarbon is hexane, heptane, octane or cyclohexane.

25. A process according to claim 23, wherein the aromatic hydrocarbon is benzene, toluene, xylene, or ethylbenzene.

26. A process according to claim 23, wherein the halogenated hydrocarbon is chlorobenzene, trichloroethylene, or tetrachloroethylene.

27. A process according to claim 1, wherein an amount of the α-olefin contained in the interpolymer is 15 to 85 mole-%.

28. A process according to claim 1, wherein an amount of the nonconjugated diolefin having a norbornene ring contained in the interpolymer is 3 to 60 in terms of iodine value.

29. A process according to claim 1, wherein the polymerization is carried out at a temperature of −50° to 100°C.

30. A process according to claim 1, wherein the polymerization is carried out under a pressure of 1 to 50 kg/cm².

31. A process according to claim 1, wherein the polymerization is carried out intermittently or continuously.

* * * * *